United States Patent [19]

Gardner et al.

[11] Patent Number: 4,503,018

[45] Date of Patent: Mar. 5, 1985

[54] DESULFURIZATION OF PHOSPHOGYPSUM

[75] Inventors: Samuel A. Gardner, Lakeland, Fla.; Thomas E. Ban, South Euclid, Ohio

[73] Assignee: Davy McKee Corporation, Lakeland, Fla.

[21] Appl. No.: 466,111

[22] Filed: Feb. 14, 1983

[51] Int. Cl.³ ............... C01B 17/50; C01F 11/08
[52] U.S. Cl. .................. 423/168; 423/178; 423/542; 423/638; 432/72
[58] Field of Search ............ 423/168, 178, 322, 323, 423/539, 542, 638; 106/103

[56] References Cited

U.S. PATENT DOCUMENTS

| | | |
|---|---|---|
| 1,069,191 | 8/1913 | Von Schuppenbach ........... 423/542 |
| 1,801,741 | 4/1931 | Hasselbach ................... 106/103 |
| 1,824,351 | 9/1931 | Hunt . |
| 2,086,733 | 7/1937 | Miles et al. . |
| 2,263,766 | 11/1941 | Fentress et al. . |
| 2,391,328 | 12/1945 | Mohr et al. . |
| 2,426,147 | 8/1947 | Horn ........................ 106/103 |
| 3,087,790 | 4/1963 | Wheelock et al. . |
| 3,169,269 | 2/1965 | McDowell et al. . |
| 3,196,981 | 7/1965 | Hansford et al. . |
| 3,260,035 | 7/1966 | Wheelock et al. . |
| 3,302,936 | 2/1967 | Ban . |
| 3,325,395 | 7/1967 | Ban . |
| 3,582,276 | 6/1977 | Campbell et al. . |
| 3,595,610 | 7/1971 | Brinkman et al. . |
| 3,607,045 | 9/1971 | Wheelock . |
| 3,607,068 | 7/1971 | Campbell et al. . |
| 3,729,551 | 4/1973 | Gorin . |
| 3,956,456 | 5/1976 | Keller et al. . |
| 3,986,819 | 10/1976 | Heian ....................... 106/103 |
| 4,102,989 | 7/1978 | Wheelock . |
| 4,111,755 | 9/1978 | Ban et al. . |
| 4,144,312 | 3/1979 | Lupis ....................... 423/178 |
| 4,162,170 | 7/1979 | Grancharov et al. . |
| 4,176,157 | 11/1979 | George et al. . |
| 4,200,517 | 4/1980 | Chalmers et al. . |
| 4,220,454 | 9/1980 | Ban et al. . |
| 4,247,518 | 1/1981 | Charlet et al. . |
| 4,299,634 | 11/1981 | Hutter et al. . |
| 4,312,842 | 1/1982 | Wilson et al. . |

FOREIGN PATENT DOCUMENTS

| | | | |
|---|---|---|---|
| 248760 | 1/1964 | Australia .................... 423/168 |
| 1913244 | 9/1970 | Fed. Rep. of Germany ...... 106/103 |
| 2724126 | 12/1977 | Fed. Rep. of Germany ...... 106/110 |
| 694035 | 7/1953 | United Kingdom ............. 423/638 |
| 682467 | 9/1979 | U.S.S.R. ................... 423/638 |
| 775051 | 11/1980 | U.S.S.R. ................... 106/103 |

Primary Examiner—Gary P. Straub
Attorney, Agent, or Firm—Bernard, Rothwell & Brown

[57] ABSTRACT

Phosphogypsum is mixed with fine coal, balled, and charged to a travelling grate where the charge is heated under reducing conditions to evolve sulfur and/or sulfur dioxide for conversion into sulfuric acid.

14 Claims, 4 Drawing Figures

DESULFURIZATION OF PHOSPHOGYPSUM

BACKGROUND OF THE INVENTION

1. Field of the Invention

The present invention relates to methods and apparatus for producing useful products from phosphogypsum, a by-product of fertilizer manufacturer, and particularly to the removal of sulfur, as sulfur dioxide and/or sulfur, for producing sulfuric acid.

2. Background Art

In the manufacture of phosphoric acid from phosphate rock such as is utilized in the manufacture of fertilizer, substantial quantities of gypsum are produced creating gypsum piles which are an eyesore as well as possibly presenting a hazard to the environment. Utilizing the waste gypsum to produce a useful product has been previously suggested, for example, see U.S. Pat. Nos. 3,729,551; 4,162,170; and 4,247,518. One suggested process is to convert the phosphogypsum into sulfuric acid and lime or cement, including the utilization of coal to reduce the calcium sulfate within a fluidized bed reactor. The prior art processes for converting phosphogypsum to sulfuric acid and lime or cement, including those employing fluidized bed reactors, have heretofore been uneconomical because of energy, labor and capital costs associated with the processes considered.

SUMMARY OF THE INVENTION

An object of the invention is to produce a process and apparatus which is economical for removing sulfur from phosphogypsum suitable for manufacture of sulfuric acid.

In accordance with this and other objects, the invention is summarized in a process and apparatus for producing sulfur dioxide and/or sulfur from phosphogypsum wherein the phosphogypsum is mixed with fine coal and formed into pellets which are charged on a travelling grate where the charge is heated under reducing conditions to produce an effluent containing the sulfur dioxide and/or sulfur.

DESCRIPTION OF PREFERRED EMBODIMENT

Figure 1:
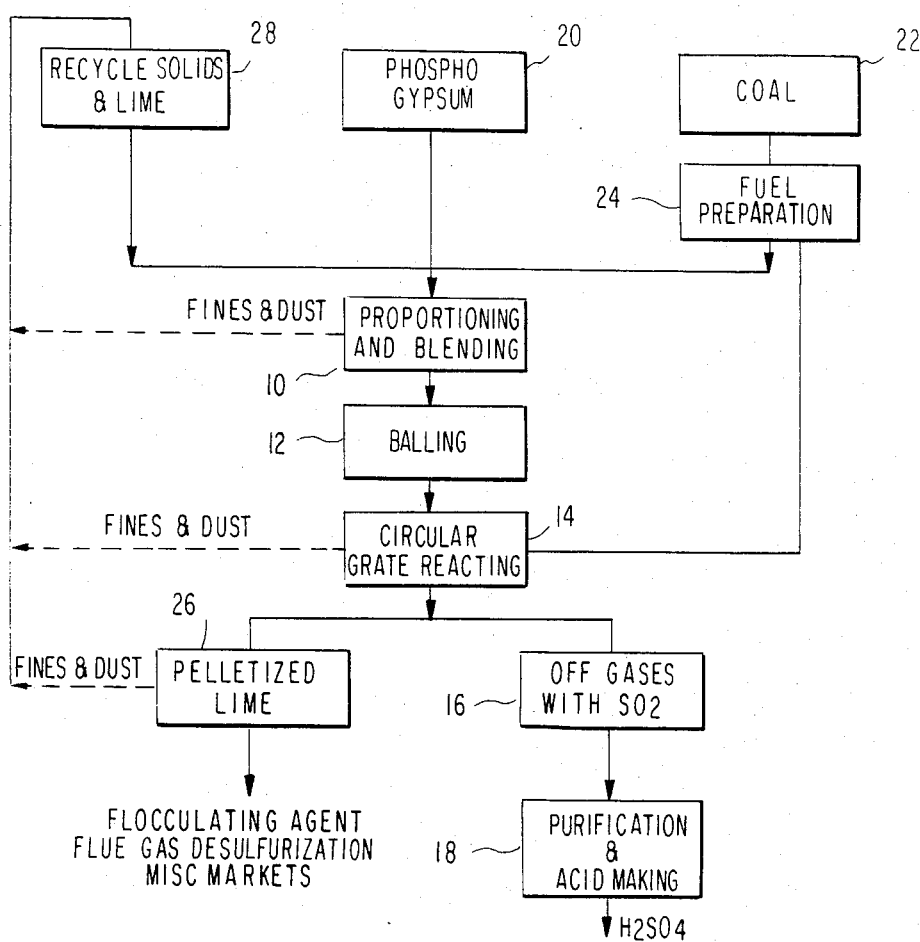
FIG. 1 is a block diagram of an arrangement of apparatus for manufacturing sulfuric acid from phosphogypsum in accordance with the invention.

As illustrated in FIG. 1, an apparatus or plant for producing sulfuric acid from gypsum such as phosphogypsum in accordance with the invention includes facilities 10 for forming a mixture of gypsum and carbon material such as coal or coke, a balling mechanism 12 for forming the mixture into pellets or balls, and a travelling grate mechanism such as a circular travelling grate 14 for heating and reducing the gypsum in the pellets to produce an effluent containing sulfur dioxide and/or sulfur which is conducted by facilities 16 to a plant 18 for converting the sulfur dioxide into sulfuric acid. Additionally, the gypsum reducing plant includes phosphogypsum handling facilities 20, coal handling facilities 22, fuel or coal preparation facilities 24, pelletized lime handling facilities 26, and recycle handling facilities 28. The preferred apparatus and process are particularly designed for processing phosphogypsum, a waste product of phosphoric acid production from phosphate rock; however the apparatus and process can be used on other gypsum materials.

Generally, phosphogypsum is a fine material with particles sized in the range from about 20 mesh to 500 mesh, and contains from about 60% to 95% $CaSO_4$ in the form of fine crystals, the remainder being silica and other impurities. The following Table I is a size analysis of a typical Florida phosphogypsum and Table II is a chemical analysis of a typical Florida phosphogypsum. The phosphogypsum handling facilities 20 includes conveyors, slurry equipment, temporary storage facilities, and/or any other equipment handling and supplying the phosphogypsum to the mixing facilities 10. The phosphogypsum facilities 20 may include additional grinding or processing prior to mixing depending upon the properties of the phosphogypsum.

TABLE I

PHOSPHOGYPSUM TYPICAL SIZE ANALYSIS
(BASED ON FLORIDA ROCK)

| Mesh Size | Cumulative % |
|---|---|
| +20 M | 4.6 |
| +28 M | 9.1 |
| +48 M | 21.0 |
| +65 M | 28.8 |
| +100 M | 37.7 |
| +200 M | 62.6 |
| +325 M | 69.3 |
| −325 M | 30.7 |

TABLE II

PHOSPHOGYPSUM TYPICAL CHEMICAL ANALYSIS

| | Weight % (Dry Basis) |
|---|---|
| Total $P_2O_5$ | 0.78 |
| Insol. $P_2O_5$ | 0.44 |
| Water Soluble $P_2O_5$ | 0.34 |
| CaO | 37.70 |
| $F_2O_3$ | 0.10 |
| $Al_2O_3$ | 0.03 |
| $Na_2O$ | 0.11 |
| $K_2O$ | 0.05 |
| $SiO_2$ | 3.90 |
| F | 0.12 |
| Cl | 0.01 |
| MgO | 0.00 |
| $SO_3$ | 54.60 |
| Total C | 0.14 |

The carbon material used to reduce the gypsum is preferably a high sulfur content coal. Optionally other carbonaceous or reducing materials such as coke, petroleum coke, elemental sulfur, pyrite or other sulfides, etc. may be used in place of coal. The fuel or coal supply facilities and fuel preparation facilities, illustrated by respective boxes 22 and 24, include storage facilities, conveyors, grinding mechanism, e.g. wet ball milling equipment, coking facilities, and/or other equipment suitable for the handling and preparation of the fine coal, coke or other carbon material supplied to the mixing facility 10 as well as coal or other fuel necessary for producing heat in the travelling grate 14.

For proper balling, it is generally preferable that a portion of the mixture fed to the balling mechanism 12 be relatively fine; these fines may be coal, gypsum, lime or mixtures thereof, or some other ingredient. The coal may be ground to fines 10 to 15%—10 microns in size prior to mixing, for example by open circuit wet ball milling, or the coal may be coarse when fed to the mixing facilities 10, and the coarse coal and phosphogypsum mixed and ground together so that the combined mixture, after grinding, will be 10 to 15% of less than 10 microns in size. As another alternative, recycle lime used as a binding agent may form a portion or all of the small particle material.

The proportioning and mixing facilities 10 includes suitable surge hoppers, weigh feeders and other equipment for producing a mixture of phosphogypsum and coal at a ratio to produce a ratio of gypsum to fixed carbon of about 92–97% gypsum and about 7–3% fixed carbon, by weight. Recycle solids and fines from the proportioning and blending 10, the circular grate 14, and lime handling 26 are handled by recycle facilities 28 for reintroduction into the proportioning and blending 10. Recycle materials of fines and lime are proportioned as generated; lime, e.g. 1 to 10% lime by dry weight, particularly being included for aiding in the inhibition of corrosion during the process as well as for aiding in the balling procedure.

The balling mechanism can be an open circuit balling pan arrangement or a closed circuit balling drum arrangement with sizing devices such as vibrating screens or roller separators. The balling mechanism is designed to produce balls or green pellets about 0.5 inches (13 mm) in diameter. One example of a suitable pelletizing pan apparatus is illustrated in U.S. Pat. No. 3,169,269. Water and/or other ingredients may be added to the mixture being balled to aid in the forming of green pellets.

The travelling grate mechanism 14 includes sealed hoods and burners for heating the pellets under controlled reducing atmospheric conditions to evolve the fixed or combined sulfur as element sulfur and/or sulfur dioxide from the phosphogypsum. Preferably the travelling grate mechanism 14 is a liquid sealed circular grate (Carousel type) similar to the circular travelling grates commercially available from Davy McKee Corporation, 6200 Oak Tree Boulevard, Cleveland, Ohio 44131 U.S.A., having sufficient size in order to economically handle large quantities of pellets.

Figure 2:
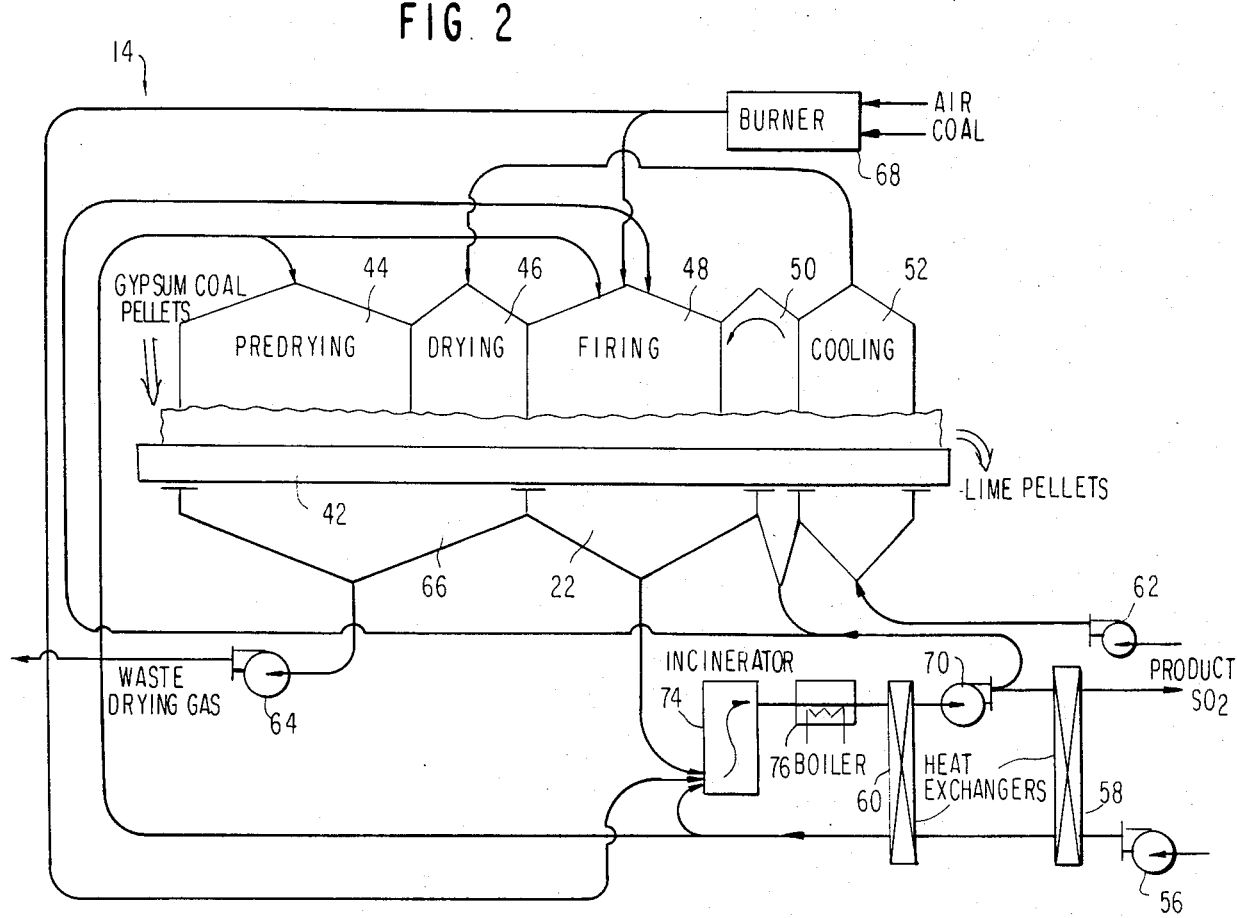
FIG. 2 is a diagrammatic panned section view of a circular travelling grate suitable for use in the apparatus of FIG. 1.
Figure 3:
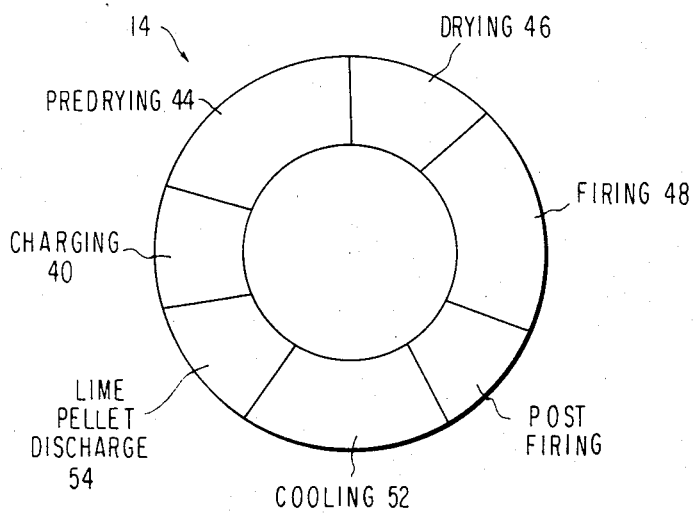
FIG. 3 is a diagrammatic plan view of the circular travelling grate of FIG. 2.

An example of a suitable circular travelling grate mechanism 14 is illustrated in FIGS. 2 and 3. The mechanism 14 includes facilities 40 for depositing a charge of green pellets upon a moving grate 42 which successively moves the charge through various zones, such as predrying zone 44, drying zone 46, firing zone 48, post-firing zone 50 and cooling zone 52, within a sealed hood to a facility 54 for discharging lime pellets from the travelling grate. In the predrying zone 44, air from blower 56, and which is heated in heat exchangers 58 and 60 by the product gas, is employed to remove at least a portion of the moisture from the green pellets. Blower 62 drives air upward through the hot charge on the grate 42 in the cooling zone 52 and thence to the drying zone 46 where the air completes the drying of the green pellets. The moist waste drying air is removed by blower 64 from a wind box 66 extending in the predrying and drying zones. A burner, such as a fixed bed gas producer 68 operating on high sulfur content coal to produce hot raw low BTU gas, supplies heated gas to the firing zone 48 sufficient to heat the pellet charge to a temperature within the range from 1800° to 2200° F. (980° to 1200° C.). Quantities of fresh air from the blower 56 and recycled product gas from blower 70 are also supplied to the firing zone 48; the atmosphere in the charge being maintained at least non-oxidizing and preferably reducing. The product gas is removed from the firing zone 48 via wind box 72 and is then passed through an incinerator 74 where combustible gas products are burned with fresh air from blower 56 and hot low BTU gas from burner 68. In post-firing zone 50, a portion of the product gas from blower 70 is recycled to pass upward through the charge and then downward into the product receiving wind box 72 to remove the greatest portion of product gas from the charge. The output product gas from the incinerator 74 is passed through a waste heat boiler 76 and the heat exchangers 60 and 58 where heat from the process is recovered.

Heating the pellets in the firing zone 48 within a neutral or reducing atmosphere causes one or both of the following endothermic reduction reactions between the carbon and gypsum.

$$CaSO_4 + C \rightarrow CaO + CO + SO_2$$

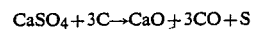

$$CaSO_4 + 3C \rightarrow CaO + 3CO + S$$

These reactions may generally occur with intermediate production of calcium sulfide and its reaction with calcium sulfate. Carbon dioxide may be produced in place of at least some of the carbon monoxide, particularly at lower temperatures and under more oxidizing conditions. Additionally, oxygen in the draft passing through the charge may exothermally react with carbon and carbon monoxide.

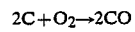

$$2C + O_2 \rightarrow 2CO$$

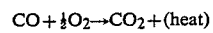

$$CO + \tfrac{1}{2}O_2 \rightarrow CO_2 + (heat)$$

This helps maintain a reducing environment during the reduction as well as supplying additional heat to maintain the reduction reaction. Carbon monoxide and elemental sulfur produced in the firing zone 48 will subsequently be oxidized in the incinerator 74 to carbon dioxide and sulfur dioxide. The total reaction process may be expressed in the following equation:

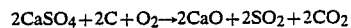

$$2CaSO_4 + 2C + O_2 \rightarrow 2CaO + 2SO_2 + 2CO_2$$

Figure 4:
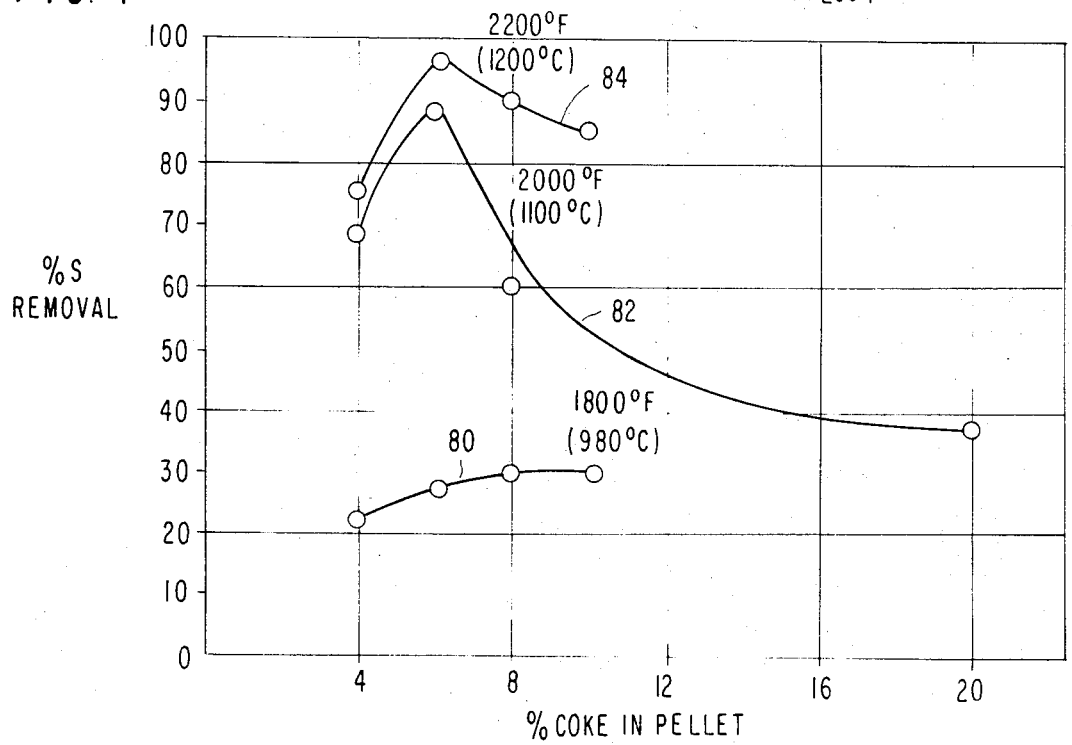
FIG. 4 is a graph showing percentages of sulfur removal for varying percentages of coke in a pellet at different temperatures.

In FIG. 4, curves 80, 82 and 84 show percentages of sulfur removed for varying percentages of coke (containing about 80% fixed carbon) in the pellets at respective temperatures of 1800° F. (980° C.), 2000° F. (1100° C.) and 2200° F. (1200° C.). As shown by these curves, the most efficient removal of sulfur is performed at temperatures above 2000° F. (1100° C.) with a coke content of about 6 parts (about 5 parts fixed carbon) by weight relative to a phosphogypsum content of about 94 parts (about 87 parts gypsum) by weight. Excess carbon above the stoichiometric quantity may be included in the pellets to produce combustible material for the incinerator 74.

The following Tables III, IV, V and VI represent raw materials, material balance, overall heat balance and product gas analysis derived from calculations concerning the process.

TABLE III

RAW MATERIALS

| Phosphogypsum | % | Coal | % | Recycle | % |
|---|---|---|---|---|---|
| $CaSO_4.2H_2O$ | 92 | Fixed Carbon | 60 | CaO | 76.7 |
| $CaCO_3$ | 1 | Volatile Matter | 30 | $CaSO_4$ | 7.8 |
| $CaF, SiO_2, P_2O_3$ | 7 | Ash | 10 | $CaF, SiO_2,$ | 16.6 |
|  |  | Sulfur | 5 | $P_2O_3$ |  |

| Pellet Composition (Dry Basis) | % | |
|---|---|---|
| Phosphogypsum | 87.03 | |
| Coal | 6.97 | (Above stoichiometric, excess for incineration.) |
| Recycle | 6.00 | |

TABLE IV

MATERIAL BALANCE
Basis: 1 Minute of flowsheet rate, 2000 lbs phosphogypsum, dry basis.

|  | Stoichiometric C lb/min | Excess Coal lb/min |
|---|---|---|
| Input | | |
| Green Pellets | 2872 lbs | 2872 lbs |
| Low BTU Gas to Hood | 911.2 | 911.2 |
| Low BTU Gas to Incinerator | 759.3 | 445.3 |
| Air to Cooling | 3920 | 3920 |
| Air to Predrying | 12604 | 12604 |
| Air for Combustion in Hood | 1385 | 1385 |
| Air for Combustion in Incinerator | 1154 | 1435 |
|  | 23605.5 | 23572.5 |
| Output | | |
| Spent pellets | 947.6 lbs | 947.6 lbs |
| Exhaust Product Gas | 5174.6 | 5141.6 |
| Waste Drying Gas | 17483.3 | 17483.3 |
|  | 23605.5 | 23572.5 |

TABLE V

OVERALL HEAT BALANCE
Basis: 1 Minute of flowsheet rate, 2000 lbs phosphogypsum, dry basis.

|  |  | MMBtu/min |  |
|---|---|---|---|
| Heat In | | | |
| Low BTU Gas - Firing Zone | latent | 2.378 | |
|  | sensible | .268 | |
| Low BTU Gas - Incenerator | latent | 1.982 | Stoichiometric carbon .936 replaced by excess coal in pellet |
|  | sensible | .223 | |
|  |  | 4.851 | |
| Heat Out | | | |
| $H_2O$, latent and sensible gas |  | 1.131 | |
| Waste drying gases |  | .572 | |
| Endothermal reaction |  | 1.277 | |
| Exhaust product gases |  | .164 | |
| Steam (waste heat boiler) |  | 1.494 | |
| Spent pellets |  | .041 | |
| Losses |  | .172 | |
|  |  | 4.851 | |

TABLE VI

PRODUCT GAS ANALYSIS

|  | Low BTU Gas Combustion Moles | Residual Coal Combustion Moles | Phosphogypsum Decomposition Moles | Total Moles | % |
|---|---|---|---|---|---|
| $CO_2$ | 18.52 | 5.53 | 5.13 | 29.18 | 18.6 |
| $H_2O$ | 11.43 | | | 11.43 | 7.3 |
| $N_2$ | 84.36 | 20.80 | | 105.16 | 67.1 |
| $SO_2$ | .51 | .25 | 10.25 | 11.01 | 7.0 |
|  |  |  |  | 156.78 | 100.0 |

The calculations in these tables are based upon assumptions that (1) 96 percent yield of sulfur from phosphogypsum as $SO_2$, (2) use of stoichiometric carbon or surplus coal in the green pellets with excess fuel units consumed in the incinerator with stoichiometric oxygen from air, (3) maintenance of oxidizing zones for drying and cooling, and neutral to reducing zones for firing the post-firing, and (4) establishment of waste heat boiler, heat exchangers and draft recirculation systems within the temperture-draft composition allowances.

The material balance presented in Table IV is based upon 2000 pounds of dry phosphogypsum. In the first column, the calculations are based upon inclusion of stoichiometric quantities of carbon as part of the pellet blend, and in the second column the calculations are based upon the use of excess coal wherein the amounts above stoichiometric carbon were considered to be gasified or evolved as condensibles for subsequent oxidation in the incinerator.

From Table V, it is noted that 4.851 million BTU per ton of phosphogypsum are required for sustaining the process. Additionally, however, stoichiometric carbon from coal is required for the desulfurizaion reaction in the amount of 0.834 million BTU per ton. The heat balance shows 1.345 million BTU (assuming about 10% loss) generated as by-product steam.

Table VI shows a product gas analysis with 7.0 $SO_2$ without excess oxygen. If required, this could be increased to about 8 to 10 percent through use of a sulfur burner as fuel for the incinerator instead of using low BTU gas or by incorporation of sulfur or sulfides as additives to the phosphogypsum.

The effluent gas removed by blower 76 through heat exchanger 58 is passed to the sulfuric acid plant 18. The plant 18 can be any suitable plant such as that available from Davy McKee, Lakeland, Fla. 33803 which employs the Davy Double Absorption catalytic process to convert sulfur dioxide into sulfuric acid.

The facilities 26, include hoppers, conveyors, storage means, etc., for handling the lime pellet by-product from the travelling grate 14. This lime by-product may be sold or used in pollution control or as a flocculating agent for slimes associated with phosphoric acid production, for flue gas desulfurization, for stabilizing solid wastes from beneficiation plants, or other use.

The present invention results in a more economical and useful method and apparatus for converting existing phosphogypsum piles into useful by-products (sulfuric acid, lime and steam) than has been possible in the prior art. The cost of the present method and apparatus is competitive with present sulfur burning plants for generating sulfur dioxide to be converted into sulfuric acid.

Since many modifications, variations and changes in detail may be made in the above described embodiment without departing from the scope and spirit of the invention, it is intended that all matter in the foregoing description and shown in the accompanying drawings be interpreted as illustrative and not in a limiting sense.

What is claimed is:

1. A process for producing sulfur and/or sulfur dioxide from gypsum comprising the steps of:
   forming a mixture of fine carbon material and fine gypsum material,
   balling the mixture to form pellets,
   charging the pellets to a travelling grate,
   moving the travelling grate to carry the charge of pellets successively through firing and post firing zones,
   heating the charge on the grate in the firing zone under non-oxidizing conditions to produce a gaseous effluent containing sulfur dioxide or sulfur or both sulfur and sulfur dioxide, and
   passing a portion of the gaseous effluent from the firing zone through the charge in the post firing zone.

2. A process as claimed in claim 1 wherein the carbon material is coal, coke or petroleum coke.

3. A process as claimed in claim 1 wherein the fixed carbon material and gypsum material are mixed in a ratio to produce a ratio of gypsum to fixed carbon of about 92–97% gypsum to about 8–3% fixed carbon.

4. A process as claimed in claim 1 wherein the heating is in the range from 980° C. to 1200° C.

5. A process as claimed in claim 1 wherein the gypsum material is phosphogypsum.

6. A process as claimed in claim 1 wherein the forming of the mixture of fine carbon material and fine gypsum includes forming a moist mixture; the moving of the travelling grate includes carrying the charge of pellets successively through predrying and drying zones prior to the firing zone and carrying the charge through a cooling zone after the post firing zone; and there is further included the steps of subjecting the charge in the predrying zone to air heated by heat exchange from the gaseous effluent, and subjecting the charge in the drying zone to air heated by passing through the charge in the cooling zone.

7. A process as claimed in claim 1 wherein the portion of gaseous effluent passed through the charge in the post firing zone is combined with the gaseous effluent from the firing zone, and the portion of gaseous effluent being passed through the charge in the post firing zone is taken from the combined effluent.

8. A process as claimed in claim 7 wherein the forming of the mixture of fine carbon material and fine gypsum includes forming a moist mixture; the moving of the travelling grate includes carrying the charge of pellets successively through the predrying and drying zones prior to the firing zone and carrying the charge through a cooling zone after the post firing zone; and there is further included the steps of subjecting the charge in the predrying zone to air heated by heat exchange from the gaseous effluent, and subjecting the charge in the drying zone to air heated by passing through the charge in the cooling zone.

9. A process for producing sulfur and/or sulfur dioxide from phosphogypsum comprising the steps of
   forming a mixture of fine high-sulfur content coal and fine phosphogypsum so that the mixture includes at least about 3 to 8 parts by weight fixed carbon content for every 92 to 97 parts by weight gypsum content,
   balling the mixture to form pellets having a diameter of about 13 mm,
   charging the pellets to a circular travelling grate to form a layer of pellets on the grate,
   moving the grate and layer of pellets successively through drying, firing, post firing and cooling zones in a sealed hood arrangement,
   burning high sulfur content fuel in a fixed bed gas producer to produce a hot raw low BTU gas,
   feeding the hot gas to the firing zone to heat the pellets to about 1200° C. to produce a product gas containing sulfur or sulfur dioxide or both sulfur and sulfur dioxide from the pellets,
   removing the product gas from the firing zone, and
   passing a portion of the product gas through the charge in the post firing zone.

10. A process as claimed in claim 9 wherein the mixture includes an excess amount of carbon above the stoichiometric amount of carbon for reacting with the gypsum, the heating of the pellets produces combustibles in the effluent, and the combustibles are then burned in an incinerator.

11. A process as claimed in claim 10 wherein a portion of the hot raw low BTU gas is fed to an incinerator to which the product gas is fed along with stoichiometric amounts of oxygen containing gas to burn any residual combustibles in the product gas.

12. A process as claimed in claim 9 wherein the forming of the mixture of fine carbon material and fine phosphogypsum includes forming a moist mixture; the moving of the travelling grate includes carrying the charge of pellets through a predrying zone prior to the drying zone; and there is further included the steps of subjecting the charge in the predrying zone to air heated by heat exchange from the product gas, and subjecting the charge in the drying zone to air heated by passing through the charge in the cooling zone.

13. A process as claimed in claim 9 wherein the portion of product gas passed through the charge in the post firing zone is combined with the product gas from the firing zone, and the portion of product gas being passed through the charge in the post firing zone is taken from the combined gas.

14. A process as claimed in claim 13 wherein the forming of the mixture of fine carbon material and fine phosphogypsum includes forming a moist mixture; the moving of the travelling grate includes carrying the charge of pellets through a predrying zone prior to the drying zone; and there is further included the steps of subjecting the charge in the predrying zone to air heated by heat exchange from the product gas, and subjecting the charge in the drying zone to air heated by passing through the charge in the cooling zone.

* * * * *